Dec. 19, 1967  R. FLINTH  3,358,500
SUPPORTING MEANS FOR A MEASURING DEVICE FOR MECHANICAL FORCES
Filed May 24, 1965
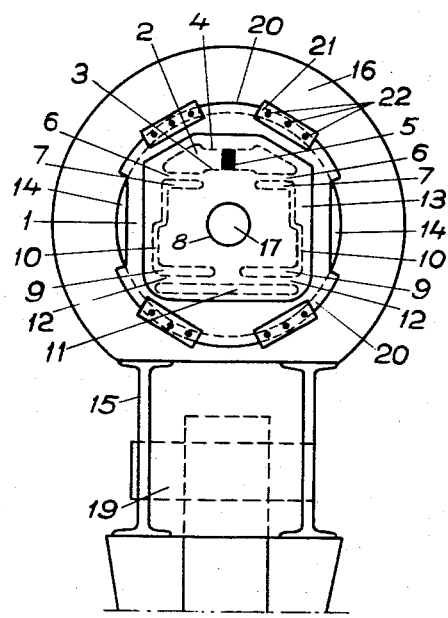
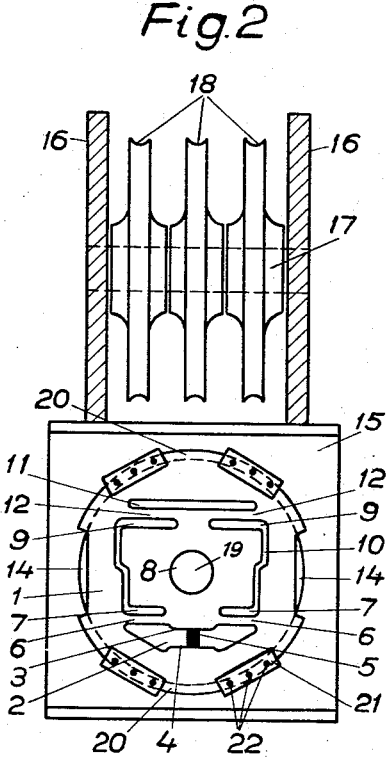
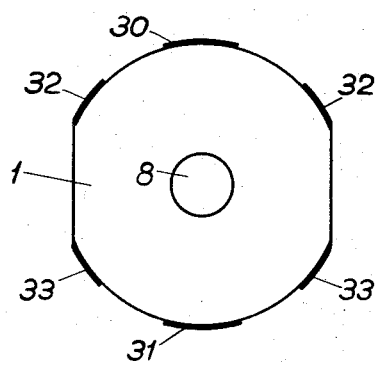
INVENTOR.
RUNE FLINTH
BY
ATTORNEYS 3,358,500
SUPPORTING MEANS FOR A MEASURING
DEVICE FOR MECHANICAL FORCES
Rune Flinth, Vasteras, Sweden, assignor to Allmänna Svenska Elektriska Aktiebolaget, Vasteras, Sweden, a corporation of Sweden
Filed May 24, 1965, Ser. No. 458,167
Claims priority, application Sweden, June 17, 1964, 7,369/64
1 Claim. (Cl. 73—141)

ABSTRACT OF THE DISCLOSURE

A weighing device for suspending loads in lifting equipment has a holder with pressure-sensitive measuring means inserted in an aperture in the holder. The outline of the holder is circular to fit in a circular opening in a force-transmitting part of the weighing device. The holder with the measuring means is manufactured and calibrated as a complete unit ready for inserting in the opening.

---

The United States Patent 3,103,810 relates to a supporting means for a measuring device for mechanical forces. This means comprises a block provided with an aperture in which a pressure sensitive device is inserted between two opposite sides in a prestressed condition and is besides provided with slots so that the necessary resilience in the block is produced in the direction of the mechanical force.

It is known to use such supporting means in weighing equipment for suspended loads, for example in hoisting cranes, travelling cranes and similar devices. An assumption for weighing in such cases is that the pressure sensitive device is placed in the lifting equipment as close as possible to the load to be weighed. The insertion is therefore preferably made at the points where the whole load is taken up by shafts or the like, for example at the bearings of the shaft on which the rope discs of the lifting arrangement are placed or at the fastening points for the lifting hook. Usually this is done by exchanging for the part of the lifting equipment which encloses the supporting means a specially made part including said supporting means. Often this procedure means that a large and expensive part of the machinery must be remade and exchanged. When the new part has been put in place in the lifting equipment, the weighing equipment must be calibrated. During the time required for the exchange of the part which includes the supporting means and during the calibration of the measuring equipment, the lifting equipment is not able to be used.

With the present invention the said disadvantages are avoided to a great extent. The invention is characterised in that the block has such outer contours that it can be inserted together with the measuring body as a pre-calibrated unit in a substantially circular recess in a part of the lifting equipment which takes up forces and that the block has a central part which is provided with a device for transmitting the force to be measured to the block.

The reason for the choice of a circular shape of the block and the aperture in the part for taking up forces is because this shape is the most simple and the safest, both from the point of view of the work itself and the possibility of getting small tolerances. At the working place it is thus only necessary to make a circular hole in a part of the lifting equipment which takes up forces. The block can be manufactured at the time of the delivery of the weighing equipment and the measuring device put in place and calibrated. The calibration is of course carried out both more simply and safely if it is done in the laboratory with proper equipment and under considerably better conditions than with transportable equipment at a working place. At the working place it only remains to place and attach the ready-made measuring equipment in the ready-made circular aperture.

On the accompanying drawing two embodiments of the invention are shown. FIG. 1 shows the measuring device built into the bearings of the shaft, which supports the rope pulleys, while FIG. 2 shows that it is inserted into the lifting yoke. FIG. 3 shows how the circular surface of the block can be made.

In the figures, 1 designates a block in which there is an opening 2. In the opening the block has two parallel surfaces 3 and 4, which are carefully machined and between which the measuring body 5 can be inserted after the surfaces have been pushed apart. The parts 6 between the opening 2 and two horizontal slots 7 act as resilient membranes which keep the measuring body in a prestressed condition between the surfaces 3 and 4. In the part of the block there is a hole 8 for a shaft. On the opposite side of the hole 8 from the measuring body, there are two horizontal slots 9. Each of the slots 7 is connected with one of the horizontal slots 9 by means of one of two substantially vertical slots 10. In the block there is also a further horizontal slot 11, by which two resilient membranes 12 are formed between the slots 9 and 11. The central part of the block which contains the hole 8 is thus by means of the membranes 6 and 12 held yieldably in the vertical direction, but rigidly connected with the outer part of the block in the horizontal direction. The block 1 has a substantially circular outer contour, but since the load works in the vertical direction a round segment 14 on each side has been bevelled in order to facilitate working and mounting. These bevels do not influence the correct functioning of the measuring device in any way.

In the embodiment shown in FIG. 1 the block is placed in a circular aperture in the flanges 16 fastening the lifting yoke 15 of the lifting equipment, in which the shaft 17 for the rope pulleys 18 is positioned. FIG. 2 shows the block placed in circular apertures in the lifting yoke 15. Here a shaft 19 passes through the hole 8 in the block, the lifting hook of the lifting equipment being placed on said shaft. The flange 16 and the center part of the block constitute force-transmitting parts between which force is transmitted by the pressure-sensitive measuring device. The aperture 2 is located between the force-exerting bottom portion of the flange 16 and the center part of the block, dividing such center part from an outer part which is in force-transferring relation to the adjacent part of the block.

In order to fasten the block to the part which can take up loads, it is provided with flanges 20 which lie against the part which can take up loads when the block is inserted into the circular aperture. The block is fastened by means of plates 21 and bolts 22 in a way known per se.

As previously mentioned, the load works only in the vertical direction and it is therefore not necessary to finish all the circular surface of the block. From the point of view of the transmission of force, it is therefore sufficient that as FIG. 3 shows, only the parts 30 and 31 of the circular circumference surface situated directly above and directly below the hole 8 need be finished to an accurate fit against the circular aperture in the part which can take up loads. In order that the block shall have a rigid fit in the cylindrical aperture, it is also suitable to form similar fitting parts 32 and 33 on either side of the upper and lower fitting parts 30 and 31 respectively. The intermediate space between the fitting parts does not need to be finished with precision and the erection work is facilitated.

As a pressure sensitive device, the measuring body shown in the United States Patent 3,103,810 is particularly suitable, mainly because of the fact that it is very slightly compressed when loaded. The dimension change from zero to full load is of the order of 10µ. Other measuring devices can also be used if their compression upon loading is slight.

I claim:

In lifting equipment, a first force transmitting part having a substantially circular opening therein and attached at one side to said lifting equipment, a holder having a substantially circular outline positioned in said opening and supported at several points spaced around its periphery by said first force-transmitting part, said holder having a second force transmitting part in its center and said holder having an opening therein on one side of said second force transmitting part opposite said point of attachment of said first force transmitting part to said lifting equipment and an outer part on the other side of the opening which is in force-transferring relation with the first transmitting part and at least one pressure sensitive measuring device in said opening in said holder, said device transmitting pressure between said force transmitting parts.

References Cited

UNITED STATES PATENTS

| | | | |
|---|---|---|---|
| 2,600,701 | 6/1952 | Statham et al. | 73—141 |
| 3,103,810 | 9/1963 | Agerman et al. | 73—141 |
| 3,186,220 | 6/1965 | Flinth | 73—141 |

RICHARD C. QUEISSER, *Primary Examiner.*

J. J. GILL, *Examiner.*

J. D. SCHNEIDER, *Assistant Examiner.*